United States Patent Office 2,733,154
Patented Jan. 31, 1956

2,733,154
POLISHING COMPOSITIONS

Edward Roy Taylor, Jr., Springfield, Pa., assignor to E. I. du Pont de Nemours and Company, Wilmington, Del., a corporation of Delaware No Drawing. Application August 6, 1953,
Serial No. 372,806

13 Claims. (Cl. 106—8)

This invention relates to liquid polishing wax compositions, more particularly to polysiloxane modified liquid polishing wax compositions and still more particularly to non-aqueous polysiloxane modified liquid polishing wax compositions.

Solvent type wax polishes are generally preferred over the aqueous emulsion type largely due to the fact that aqueous emulsions present stability and packaging problems. The aqueous emulsions must be protected from freezing and must be packaged either in glass or in metal containers whose inner surface is protected against the corrosive attack of the aqueous phase of the emulsion.

Non-aqueous liquid polishing compositions generally comprise a wax blend dissolved or dispersed in a hydrocarbon solvent which is relatively inert to the surface being polished. The components and the proportions of the wax blend are selected to provide the desired polishing properties, such as hardness, gloss, and durability on exposure to the weather. Generally the wax blend contains a mixture of hard wax, such as, for example, carnauba, montan, candelilla, microcrystalline hydrocarbon wax for durability and soft wax, such as, for example paraffin, beeswax, and Chinese insect wax to facilitate application. Generally, the vehicle for the wax is a volatile hydrocarbon, in which the wax blend is either dissolved or dispersed.

Recently liquid polysiloxanes, commonly known as silicones, have been incorporated in solvent type liquid polishing wax compositions to facilitate the ease of polishing. The silicone-containing polishes normally require little or no rubbing to develope a high polish, a mere wiping usually being sufficient. The polysiloxanes serve as a lubricant or plasticizer for the wax and fortify the wax film to provide increased water repellency. The polysiloxanes in the absence of wax, when used as the sole film forming material, provide glossy protective films, but such films are fluid and greasy, and for outdoor exposure, more durable films deposited from the wax/silicone blends are preferred. Heavy metal soaps, such as, for example, calcium stearate, calcium palmitate, and aluminum stearate, are often used to modify the wax polish composition to alter the viscosity characteristics and to control the crystal size and structure of the wax.

It has been observed that polishes comprising polysiloxane, wax and water-insoluble metallic soap dispersed in hydrocarbon solvent develop non-dispersible seeds and coarse flocculation when stored under conditions where the temperature fluctuates between about 0° F. and 120° F. In order to re-disperse the seeds it is necessary to heat the composition up to at least about 160° F., which is not practical in the case of the polishes packaged for consumer use.

In the case of the silicone-containing polishes which normally require little or no rubbing to develop a high polish, the presence of seed is highly objectionable since hard rubbing is required to rub out the seed, thus voiding the primary advantage of the silicone polish.

The non-dispersible seeds consist of water-insoluble metallic soaps, wax and polysiloxane substantially in the proportions as they exist in the polish composition as prepared. There is no preferential proportional seeding of the polish composition components.

The application properties of the polish composition are rendered unsatisfactory by the presence of these seed agglomerates. When the polish is applied by means of a spray gun the seed agglomerates interfere with spraying of the material by clogging the orifice of the spray gun, and any agglomerates sufficiently small to pass through the orifice cause seediness or sandiness of the deposited wax film. These seeds, which are difficult to rub out and blend to a smooth film, cause streaking.

It is an object of this invention to prevent the formation of seeds in the solvent-type polishing compositions which comprise polysiloxane, wax and a water-insoluble metal soap. A further object is to provide improved, shelf-stable, sprayable, solvent-type wax polish compositions which are stable under conditions of wide temperature fluctuation. These and other objects will become apparent to one skilled in the art as the description of the invention proceeds.

These objects are accomplished by stabilizing a solvent-type liquid polishing wax composition comprising a wax, a water-insoluble metal soap, hydrocarbon soluble liquid polysiloxane, and a hydrocarbon solvent by the addition of certain specific organic amines.

The following examples represent preferred embodiments of the invention. The parts and percentage figures are expressed on a weight basis throughout the specification.

Example I

A sprayable automobile polish was prepared as follows:

| | Percent by weight |
|---|---|
| Polydimethylsiloxane | 2.0 |
| Soft wax—beeswax | 0.5 |
| Hard wax—microcrystalline hydrocarbon wax | 1.9 |
| Aluminum stearate | 1.2 |
| Diethylethanol amine | 0.2 |
| Petroleum naphtha | 94.2 |
| | 100.0 |

The polydimethylsiloxane was a hydrocarbon-soluble liquid having a kinematic viscosity of 1000 centistokes.

The microcrystalline hydrocarbon wax was one of the commercially available hard varieties having a melting point in the range of 190° to 195° F.

The aluminum stearate was the commercial aluminum tri-stearate. This material, predominantly tri-stearate, contained a small amount of mono- and di-stearate and about 25% of stearic acid.

The diethylethanol amine is also known as 2-diethylamino ethanol.

The petroleum naphtha is characterized by a boiling range of 148° to 175° C. and an aniline point of 58° C.

The wax polish composition was prepared by dispersing the aluminum stearate in a major proportion of the petroleum naphtha by heating in the temperature range of about 160° to 175° F. with agitation until a clear dispersion was obtained and allowed to cool. The waxes were melt blended and the remaining portion of petroleum naphtha added thereto with agitation to dissolve the wax in the naphtha. When the wax solution had cooled to a temperature in the range of about 160° to 175° F., it was added, with agitation, to the aluminum stearate dispersion and maintained at a temperature of about 160° to 175° F. The liquid silicone and the diethylethanol amine were added to the combined dispersions of the metallic soap and wax then agitated to uniformly distribute the components and then cooled rapidly to room temperature.

Alternatively, the amine may be introduced either in the dispersion of water-insoluble metal soap in hydrocarbon solvent or in the wax solution prior to combining them.

The product was a translucent, sprayable dispersion, free of seed and flocculation.

A freshly prepared control product prepared identical with Example I, except that the diethylethanol amine was omitted, likewise was free of seed and flocculation. The only significant difference between the two freshly prepared samples was that the control exhibited slightly higher body than the amine stabilized composition of Example I as indicated by the respective viscosities of 36 seconds and 23 seconds as measured by Du Pont Parlin #7 cup at 25° C.

Samples of the control and the amine stabilized product were stored in sealed containers at room temperature, in an oven at 120° F., in a freezer at 0° F., and outdoors on a roof where the samples were subjected to temperature fluctuation from daily high to daily low. The samples were examined periodically for visual changes in appearance and tested for application properties and performance over lacquer and synthetic resin finishes used by the automotive industry.

In one week, the control composition showed coarse flocculation in all samples except in the oven-stored sample where the flocculation was designated as fine. All the control samples, under the various storage conditions, exhibited seediness when sprayed.

Samples of the amine stabilized composition were all comparable with one another, showing slight fine flocculation. None of the samples exhibited seed on spraying and clean-up of the wax film was very good. At storage periods of one month and two months neither the control samples nor the stabilized polish composition showed significant change beyond that observed after storage for one week.

The amine stabilized polish and the control polish after two weeks' storage at room temperature were filtered through a 100 mesh screen. There was no residue on the screen in the case of the amine stabilized polish, whereas in the case of the control sample there was a residue on the screen which, after washing with n-hexane amounted to 1.0% of the non-volatile content of the polish. This amount of seed is objectionable in a commercial polish composition.

*Example II*

An automobile polish adapted for hand application was prepared as follows:

|  | Percent by weight |
|---|---|
| Polydimethylsiloxane | 1.0 |
| Soft wax—beeswax | .7 |
| Hard wax—microcrystalline hydrocarbon wax | 1.7 |
| Aluminum stearate | .6 |
| Diethylethanol amine | .2 |
| Petroleum naphtha | 95.8 |
|  | 100.0 |

*Example III*

A furniture polish was prepared as follows:

|  | Percent by weight |
|---|---|
| Polydimethylsiloxane | 1.0 |
| Soft wax—beeswax | .7 |
| Hard wax—microcrystalline hydrocarbon wax | 1.7 |
| Aluminum stearate | .6 |
| Diethylethanol amine | .1 |
| 63% asphalt solution in petroleum spirits | .9 |
| Petroleum naphtha | 95.0 |
|  | 100.0 |

Direct substitution in the same amount as shown in the examples or within the ranges given below of either morpholine, N-aminopropyl morpholine, 2-ethylhexyl amine or butyl amine for the diethylethanol amine of the above examples provided stabilized wax polish compositions which were likewise free of coarse non-dispersible seed when subject to storage under temperature conditions fluctuating in the range of of 0° F. to 120° F. Presence of the small concentration of the amines showed no adverse effect on the quality or performance of the polish.

Not all amines have the desired stabilizing effect on the dispersion of metallic soap and wax in hydrocarbon solvent. Amines commonly used in combination with fatty acids as emulsifying agents in the preparation of aqueous emulsion polishes have not shown a stabilizing effect on the solvent-type polish. Amines such as monoethanolamine, diethanolamine, triethanolamine, di(n-butyl)amine, di(2-ethylhexyl)amine and dimethylethanol amine were found to be inoperative in the practice of this invention. The stability and performance of wax polishes containing these inoperative amines were not detectably different from that of the control.

As little as 0.02% of the operative amines based on the total composition was found to improve the stability of the wax polish and no significant advantage was seen in using more than 1.0%. The minimum concentration of amine in the range of 0.1 to 0.5% that prevents seed formation is preferred because of the odoriferous character of the amines.

Odorants commonly used to mask objectionable solvent odors of paints and enamels may be used to subjugate the less pleasing odors of the amine stabilizer and the solvent. Particularly useful odorants for modifying the amine stabilized compositions of this invention are commercially available as "Alamask" odorant which is characterized by a terpene odor; "Bouquet TW," characterized by a floral odor; and "Bouquet 67," characterized by a lemon-like odor.

Addition of any one of the operative amines, useful in the practice of this invention, to a wax polish composition at room temperature already containing seed and coarse flocculation does not redisperse the seed or modify the flocculation pattern. Once the seed is formed in the wax polish composition it is necessary to reheat the composition to at least 160° F. to redisperse the seed and flocculant, thereafter the composition may be stabilized in accordance with this invention.

Aluminum tri-stearate is the preferred water-insoluble soap for practice of this invention, however the amines found operative with aluminum stearate also stabilize the wax polish composition bodied with other water-insoluble metallic soaps such as aluminum palmitate, zinc stearate, zirconyl stearate, zirconyl laurate and calcium stearate.

The composition of the wax polish is not particularly critical in the practice of this invention. The following preferred and operative ranges are not to be construed as indicating the exact limits of the invention since the particular end use of the polish and economic considerations control the formulation limits.

|  | Percent by Wt. | |
|---|---|---|
|  | Preferred Range | Normal Operative Range |
| Water-Insoluble Wax | 2.0-5.0 | 0.5-15.0 |
| Hydrocarbon-Soluble Liquid Polysiloxane | 1.0-5.0 | 0.5-15.0 |
| Water-Insoluble Metallic Soap | 0.6-2.0 | 0.4-4.0 |
| Hydrocarbon Solvent | 96.1-87.5 | 98.4-65.0 |
| Amine Stabilizer | 0.1-0.5 | .02-1.0 |

The wax may be of animal, vegetable, mineral, insect or of synthetic origin. Although a single species of wax may be employed, it is preferred to use a blend of waxes in which the proportion of waxes commonly known as hard waxes predominates over the concentration of waxes commonly known as soft waxes. Other waxes representing useful components of the wax blend include oxidized, paraffin wax, paraffin, carnauba, candelilla, ceresine, ozokerites, montan, ouricury, spermaceti, palm, bayberry, sugar cane wax, myristic acid, hydrogenated castor oil and synthetic ester waxes.

The hydrocarbon-soluble, liquid polysiloxane is preferably polydimethylsiloxane having a viscosity of about 1000 centistokes. Lower viscosity grades of the polysiloxane, which range from 50 to 500 centistokes viscosity, are operative, but best performance was obtained using high viscosity polymer.

Although polydimethylsiloxane is the preferred hydrocarbon-soluble polysiloxane, the beneficial results are also accomplished with other liquid polysiloxanes. Those which have other organic hydrocarbon radicals attached to the oxygen-bridged silicon atoms may be used as direct replacements for the polydimethylsiloxane in the examples. The hydrocarbon radicals may be alkyl, aryl or alkaryl, such as, for example, methyl, ethyl, propyl, phenyl and benzyl, the radicals attached to a single silicon atom being alike or different.

The ratio of polysiloxane to wax may be of wide latitude, but best performance was observed where the ratio was in the range of 0.25 to 2.0 per part of wax. In the preferred composition of Example I, the ratio is 0.83 to 1.

The water-insoluble metallic soaps useful in this invention are those capable of forming a substantially clear dispersion in hydrocarbon solvent. The main functions of the soap are to control wax particle shape and size and to provide the wax dispersion with the desired viscosity for application.

The hydrocarbon solvent is preferably a petroleum naphtha having a boiling range end point preferably not exceeding about 210° C. The naphtha may be either wide boiling range material, narrow range fractions or mixtures thereof. Representative naphthas include V. M. & P. naphtha boiling in the range of 100° to 167° C., lacquer diluent naphtha boiling in the range of 88° to 142° C., mineral spirits boiling in the range of 145° to 210° C., and petroleum fraction boiling in the range of 148° to 175° C. Inasmuch as the wax polish is primarily designed for application to automotive lacquer and synthetic resin finishes, it is desirable that the hydrocarbon solvent not attack the finish. Hence the aromatic content of the polish composition should preferably be low. The aniline point of the hydrocarbon is an indication of its aromatic content and its solvency. Hydrocarbon solvents having an aniline point in the range of about 10° to 70° C. are sufficiently inert toward lacquer and synthetic resin finishes but are sufficiently active solvents to dissolve the polysiloxane and dissolve or disperse the waxes. Toluol, xylol and high solvency petroleum naphthas having an aniline point less than 10° C. may be mixed with low solvency naphthas to improve the solvency of the hydrocarbon mixture. Aliphatic petroleum naphthas generally have an aniline point in the range of 50 to 70° C.

Stabilization of solvent-type wax-polysiloxane polish dispersions containing water-insoluble metallic soaps as a bodying agent with a selected group of amines has provided a desirable improvement in the shelf stability of the product without adverse effects on the quality, application properties and performance of the product. The amine stabilized product is free of seed and coarse flocculation which forms in the non-stabilized product when subject to storage under temperature conditions fluctuating in the range of about 0° F. to 120° F. The improved product does not require protected storage under substantially uniform temperature conditions to maintain stability and freedom from formation of non-dispersible seed which is detrimental to the polishing of the wax film.

It will be apparent to one skilled in the art that many widely different embodiments of the invention may be made. Therefore, it is intended that the invention shall not be limited except as defined in the appended claims.

I claim:

1. A non-aqueous, liquid polishing composition comprising a water-insoluble wax, hydrocarbon-soluble liquid polysiloxane, water-insoluble metallic soap, a hydrocarbon solvent for the wax and an organic amine selected from the class consisting of diethylethanol amine, N-aminopropyl morpholine, 2-ethyl hexyl amine, morpholine and n-butyl amine, said amines having the property of preventing the formation of non-dispersible seeds in said composition at temperatures as low as 0° F.

2. A non-aqueous, liquid polishing composition comprising 0.5 to 15.0% water-insoluble wax, 0.5 to 15.0% hydrocarbon-soluble liquid polysiloxane, 0.4 to 4.0% water-insoluble metallic soap, 65.0 to 98.4% hydrocarbon solvent for the wax, and .02 to 1.0% of an organic amine selected from the group consisting of diethylethanol amine, N-aminopropyl morpholine, 2-ethyl hexyl amine, morpholine and n-butyl amine, said amines having the property of preventing the formation of non-dispersible seeds in said composition at temperatures as low as 0° F.

3. The composition of claim 1 where the wax is a mixture of waxes containing at least one soft wax and at least one hard wax.

4. The composition of claim 1 where the hydrocarbon-soluble liquid polysiloxane is polydimethylsiloxane.

5. The composition of claim 1 where the hydrocarbon-soluble liquid polysiloxane has a viscosity of about 1000 centistokes at 25° C.

6. The composition of claim 1 where the water-insoluble metallic soap is an aluminum soap of a fatty acid.

7. The composition of claim 1 where the water-insoluble metallic soap is aluminum stearate.

8. A stable, non-aqueous, liquid polishing composition having the following approximate composition:

| | Per cent by weight |
|---|---|
| Soft wax—beeswax | 0.5 |
| Hard wax—microcrystalline hydrocarbon wax | 1.9 |
| Polydimethylsiloxane | 2.0 |
| Aluminum stearate | 1.2 |
| Amine stabilizer | 0.2 |
| Petroleum naphtha | 94.2 |
| | 100.0 | where the amine stabilizer is selected from the group consisting of diethylethanol amine, N-aminopropyl morpholine, morpholine, 2-ethyl hexyl amine, butyl amine and mixtures thereof, said amines having the property of preventing the formation of non-dispersible seeds in said composition at temperatures as low as 0° F.

9. The process of preparing non-aqueous, polishing compositions which comprises dispersing a water-insoluble metallic soap in hydrocarbon solvent comprising petroleum naphtha by heating and agitating until a clear soap dispersion is obtained, separately melting a wax, adding hydrocarbon solvent to the melted wax with agitation to form a solution, adding said wax solution to said dispersion of water-insoluble metallic soap together with a hydrocarbon-soluble liquid polysiloxane, adding an organic amine stabilizer in an amount within the range of .02 to 1.0% by weight of total composition, continuing the agitation to unify the mixture, and cooling said composition, said amine being selected from the group consisting of diethylethanol amine, N-aminopropyl morpholine, morpholine, 2-ethyl hexyl amine and n-butyl amine, said amines having the property of preventing the formation of non-dispersible seeds in said composition at temperatures as low as 0° F.

10. The process of claim 9 in which the hydrocarbon-soluble liquid polysiloxane is polymethylsiloxane.

11. The process of claim 9 in which the water-insoluble metallic soap is aluminum stearate.

12. The process of claim 9 in which the wax is a blend of beeswax and a hydrocarbon wax.

13. The process of claim 9 in which the organic amine is diethylethanol amine.

References Cited in the file of this patent

UNITED STATES PATENTS

| | | |
|---|---|---|
| 2,483,259 | Budner et al. | Sept. 27, 1949 |
| 2,598,666 | Sesso et al. | June 3, 1952 |
| 2,614,049 | Swanson | Oct. 14, 1952 |
| 2,634,677 | Klimkowsky et al. | Apr. 14, 1953 |

FOREIGN PATENTS

| | | |
|---|---|---|
| 354,782 | Great Britain | Aug. 6, 1931 |